H. HOLLAND.
TROLLEY WHEEL MOUNTING.
APPLICATION FILED JAN. 11, 1915.
1,218,555.
Patented Mar. 6, 1917.
2 SHEETS—SHEET 1.
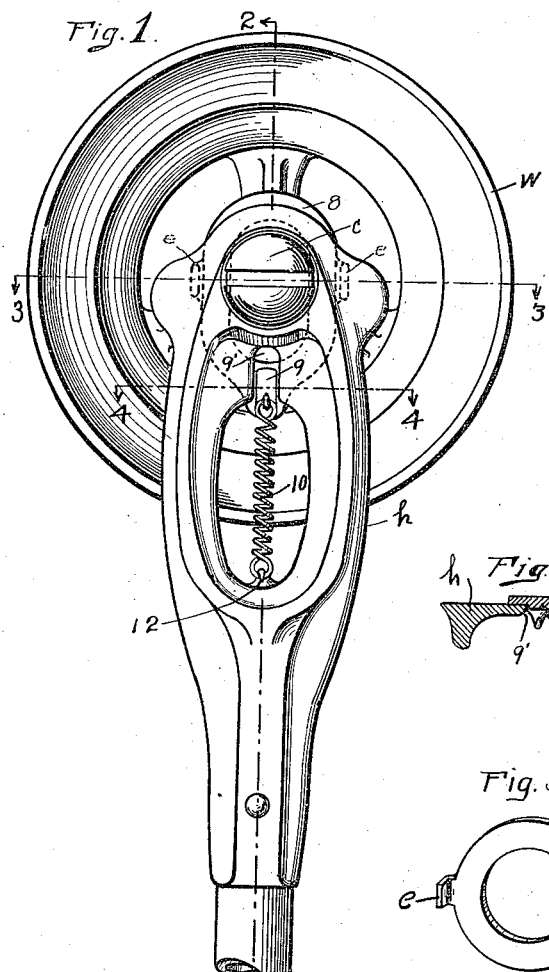
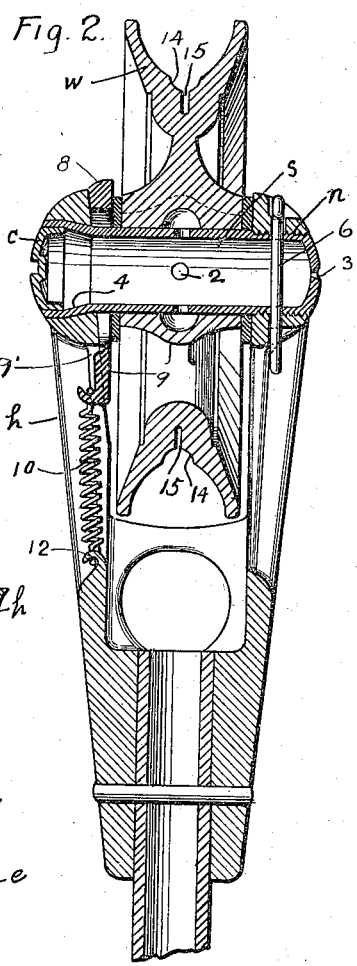
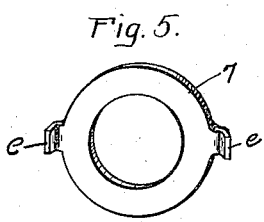
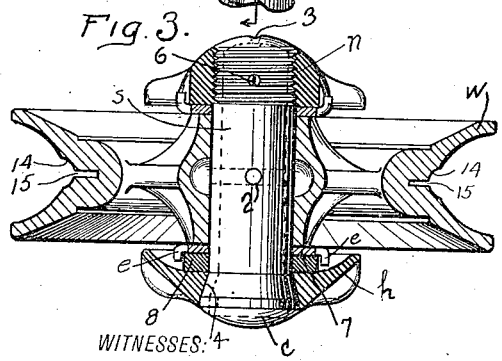
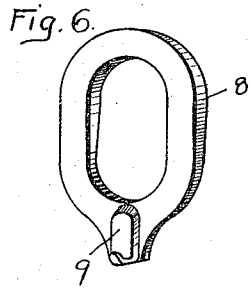
WITNESSES:
Geo. E. Kricker.
M. Schwan.
INVENTOR
Henry Holland
BY
Fisher & ......
ATTORNEY H. HOLLAND.
TROLLEY WHEEL MOUNTING.
APPLICATION FILED JAN. 11, 1915.
1,218,555.
Patented Mar. 6, 1917.
2 SHEETS—SHEET 2.
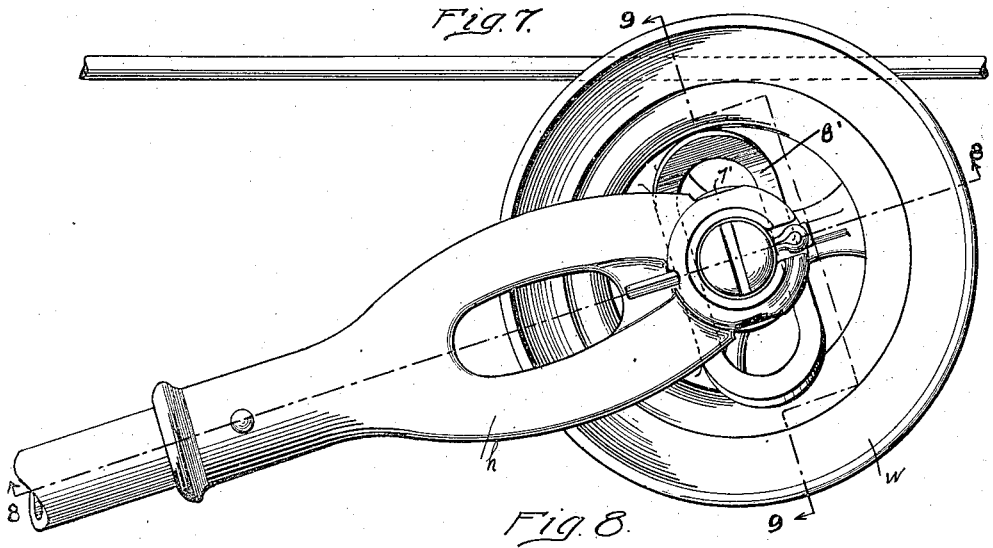
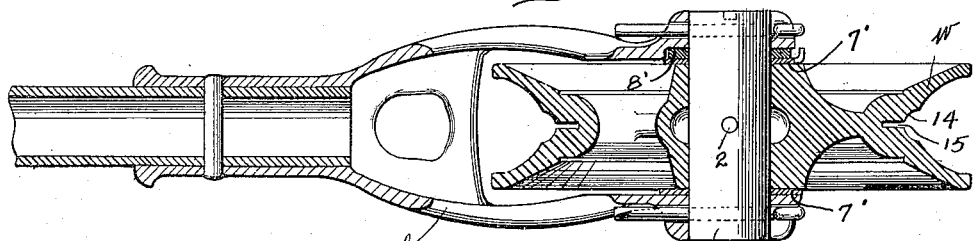
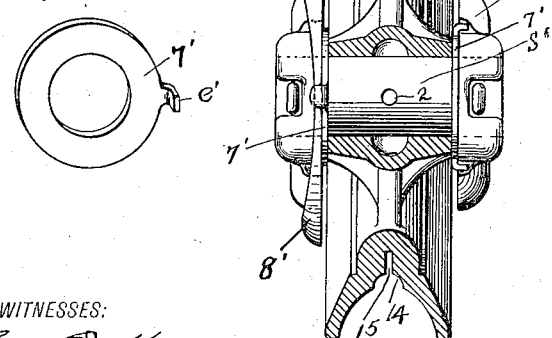
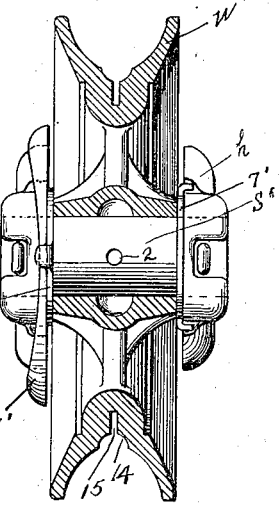
WITNESSES:
Geo. E. Kricker
M. Schwan
INVENTOR
Henry Holland
BY
Fisher + Moser
ATTORNEY

UNITED STATES PATENT OFFICE.

HENRY HOLLAND, OF CLEVELAND, OHIO.

TROLLEY-WHEEL MOUNTING.

1,218,555.  Specification of Letters Patent.  Patented Mar. 6, 1917.

Application filed January 11, 1915. Serial No. 1,507.

*To all whom it may concern:*

Be it known that I, HENRY HOLLAND, a citizen of the United States, residing at Cleveland, in the county of Cuyahoga and State of Ohio, have invented certain new and useful Improvements in Trolley-Wheel Mountings, of which the following is a specification.

This invention pertains to an improvement in trolley wheel mountings, and the main object of the invention is to secure close and uniform electrical contact with and through the wheel regardless of the possible wear of parts, the inversion of the wheel and other conditions of service. Other and minor objects are attained as will appear in the further description of the invention.

In the accompanying drawings, Figure 1 is a side elevation of a trolley wheel and a harp embodying my invention, and Fig. 2 is a sectional elevation thereof on line 2—2, Fig. 1. Fig. 3 is a sectional view on line 3—3, Fig. 1. Fig. 4 is a cross section of one side of the harp and of the end of the tightening loop or wedge on a line corresponding to 4—4, Fig. 1. Fig. 5 is a detail of one of the side bearing disks for the wheel, and Fig. 6 is a detail of the so-called loop or wedge as used in Figs. 1, 2 and 3.

Fig. 7 is a side elevation of a trolley wheel and harp in working relations with an overhead wire and disclosing a modification of the wedging loop, and Fig. 8 is a sectional plan on line 8—8, Fig. 7. Fig. 9 is a cross section of the wheel and harp on line 9—9, Fig. 7. Fig. 10 is a detail of one of the side washers and Fig. 11 a longitudinal section of the loop.

The harp *h* and the wheel *w* may be regarded as of a common and well known type, less certain featural differences as will hereinafter appear. The shaft *s* for the wheel is tubular or hollow so as to provide a chamber for a suitable lubricant and is provided with small orifices 2 at its middle to emit the lubricant and an opening 3 in an otherwise closed end to supply the lubricant to the shaft. At its other end the said shaft is flared somewhat as seen at 4, which produces an annular enlargement of the shaft at that point, and the harp is fashioned with a slightly tapered opening corresponding to said enlargement and the parts are flush outside with the plain side of the harp to afford a smooth surface and prevent catching on the trolley wire. The said shaft is engaged and tightened at the other end by a screw thread *n* and a cotter pin 6 is entered through the harp nut and shaft and locks the shaft in place. A closure *c* within the flared end of the shaft serves as a cap or stopper and is swaged or otherwise permanently secured therein.

The trolley wheel has a hub with flat finished sides and is mounted rotatably upon shaft *s* and confined at its sides between the sides of the harp by means of renewable washers 7, Figs. 2, 3 and 5, or washers 7', Figs. 8, 9 and 10 and by a substantially wedge-shaped yoke or loop 8, or wedge of loop shape interposed at one side between the harp and the washer 7. The said wedge or loop is preferably on the side of the wheel next to head 4 of the shaft *s* as seen in Fig. 2, and the harp *h* is provided with an inclined recess or flat bearing surface in that side to make accommodation for the said wedge. The lower end of the wedge has a projecting guide 9 operating in a notch or slot 9' in the side of the harp, whereby rotation of the wedge is prevented. A spiral spring 10 is attached to the hooked extremity 12 of the wedge and to the harp at its opposite end and adapted to draw the wedge into tightening relations and thus promote the close and sustained contact of the parts for which it is designed.

The washers 7 have two ears *e* to hold them in stationary position with the harp or wedge as seen in Fig. 3 and a single ear *e* as seen in Fig. 10. Either construction is sufficient.

By means of the said wedge or loop 8 a practical takeup is provided for possible side wear of the trolley wheel or looseness in the side bearings, and a perfect mechanical and electrical contact is maintained under all the varying conditions of service. All lateral play of the wheel is eliminated, and the bifurcated ends of the harp are kept apart in locked relations with the shaft. Moreover, a solid and unyielding contact is established with the sides of the wheel and the harp by the wedge and the washers. The corresponding loop or wedge 8' in Figs. 7 to 11 is essentially of the gravity type rather than spring controlled and is shaped as seen in Figs. 7 and 11, with wedging face portions at both ends and thinnest at the middle thereby providing a self-acting wedge capable of operation in reversely-inclined positions of the trolley wheel as occurs when the direction of the car is reversed and the trolley pole is inclined in an opposite direction to its former position. The wedge is actually inverted, and operative in either position. Suitable recesses or guides are provided in the harp in this case also to confine the loop in working position and enable it to slide lengthwise in contacting relations therewith, the loop being linked astride of the shaft s and confined thereon. Both loops or wedges are alike in this particular and both automatically operate to tighten in every working position of the trolley wheel.

The wheel is provided with a secondary groove 14 in the bottom of the main groove of a size substantially the same as a trolley wire, and a narrow annular channel or slot 15 in the bottom of said groove helps to center the wire and hold it therein rather than to run more or less in contact with the sides of the main groove, as otherwise occurs. In this way, the wear is kept at the center of the wheel and away from the sides of the wheel, and groove 14 also prevents the wheel from riding off the wire.

Two cotter pins are shown in Figs. 8 and 9 to hold the shaft in place, and this is alternate to the fastenings shown in Figs. 2 and 3.

A compression spring may be used in lieu of spring 10, but in either case the spring is retired sufficiently within the outer face of the harp to avoid displacement thereof by contact with the trolley wire in the event of the trolley wheel becoming displaced or in being placed upon the wire.

What I claim is:

1. A trolley wheel and mounting therefor having a wedge member interposed therebetween, said wedge member having reversely related wedging surfaces.

2. A trolley wheel and mounting, and a reversible gravity wedge in side contact relations with said wheel and mounting.

3. In trolley wheel mountings, a wheel and a shaft therefor and a wedge interposed between the said parts at right angles to said shaft and adapted to produce a close contact of the parts at the sides of the wheel and promote the flow of the electric current.

4. In trolley wheel mountings, a harp and a wheel having a hub with finished sides and a shaft through said wheel on which the harp is mounted and a wedge adapted to automatically take up any wear between said parts and to secure a close electrical contact therein, said wedge being transverse to said shaft.

5. A trolley wheel and a harp, a shaft supporting said wheel in said harp and a wedge divided by said shaft and adapted to produce a closed electrical contact between harp and wheel.

6. A trolley wheel and a harp in which the wheel is mounted, and a substantially loop shaped wedge at one side between said harp and the wheel and adapted to close the electrical contact on the wheel.

7. A trolley wheel and a harp and shaft supporting said wheel, washers on either side of the wheel and a wedge next to the harp adapted to press said washers closely against the wheel.

8. A trolley wheel and a harp and a shaft supporting the same, the said shaft being tubular and having a flared head at one end secured in the side of the harp and a wedge embracing the shaft between said harp and the wheel to maintain the said parts in constant electrical contact.

9. A trolley wheel mounting, a tubular shaft therein having a flaring end and a closure permanently fixed in said end and fastenings on the other end of shaft adapted to hold the shaft in place, a wheel on said shaft and a yoke-shaped wedge sleeved on said shaft between said wheel and mounting.

10. A trolley wheel and a mounting therefor and a wedge in gravity relations between said wheel and its mounting to maintain constant electrical contact between the said parts.

In testimony whereof I affix my signature in presence of two witnesses.

HENRY HOLLAND.

Witnesses:
R. B. MOSER,
M. SCHWAN.

Copies of this patent may be obtained for five cents each, by addressing the "Commissioner of Patents, Washington, D. C."